(12) United States Patent
Li et al.

(10) Patent No.: US 10,009,123 B2
(45) Date of Patent: Jun. 26, 2018

(54) PHASE ALIGNMENT AMONG MULTIPLE TRANSMITTERS

(71) Applicant: Texas Instruments Incorporated, Dallas, TX (US)

(72) Inventors: Fanlong Li, Shanghai (CN); Hunsoo Choo, Plano, TX (US); Kyung-wan Nam, Seoul (KR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 221 days.

(21) Appl. No.: 14/941,896

(22) Filed: Nov. 16, 2015

(65) Prior Publication Data

US 2016/0308598 A1   Oct. 20, 2016

Related U.S. Application Data

(60) Provisional application No. 62/147,123, filed on Apr. 14, 2015.

(51) Int. Cl.
| | |
|---|---|
| *H04K 1/02* | (2006.01) |
| *H04L 25/03* | (2006.01) |
| *H04L 25/49* | (2006.01) |
| *H04B 17/14* | (2015.01) |
| *H04B 7/0413* | (2017.01) |

(52) U.S. Cl.
CPC ........... *H04B 17/14* (2015.01); *H04B 7/0413* (2013.01)

(58) Field of Classification Search
CPC .... H04B 17/14; H04B 7/0413; H04B 17/104; H04L 27/0014
USPC ................................. 375/296, 297, 346, 235
See application file for complete search history.

(56) References Cited

U.S. PATENT DOCUMENTS

| | | | |
|---|---|---|---|
| 6,222,878 B1 * | 4/2001 | McCallister | ........ H04L 27/0014 375/225 |
| 2014/0286382 A1 * | 9/2014 | Dark | .................... H04B 17/104 375/227 |

\* cited by examiner

*Primary Examiner* — Phuong Phu
(74) *Attorney, Agent, or Firm* — John R. Pessetto; Charles A. Brill; Frank D. Cimino

(57) ABSTRACT

Systems and methods for phase alignment among multiple transmitters are described. In some embodiments, a method may include creating a loop between an RF transmitter and an RF receiver; measuring a first DC signal on the I and Q paths of the RF receiver without inserting a DC signal in the I and Q paths of the RF transmitter; measuring a second DC signal on the I and Q paths of the RF receiver while inserting a non-zero DC signal in the I and Q paths of the RF transmitter; and calculating a relative phase difference between the RF transmitter and the RF receiver using the first and second DC signals.

9 Claims, 3 Drawing Sheets

PHASE ALIGNMENT AMONG MULTIPLE TRANSMITTERS

CROSS-REFERENCE TO RELATED APPLICATIONS

This application claims priority to U.S. Provisional Patent Application Ser. No. 62/147,123 titled "PHASE ALIGNMENT AMONG MULTIPLE TRANSMITTERS" and filed on Apr. 14, 2015, which is incorporated by reference herein.

TECHNICAL FIELD

This specification is directed, in general, to telecommunications, and, more specifically, to systems and methods for phase alignment among multiple transmitters.

BACKGROUND

In radio frequency (RF) communications, coverage and capacity can be improved through the use of spatial diversity or spatial multiplexing. For example, using spatial multiplexing, data rates can be increased by transmitting independent information streams from different antennas but using the same channel as defined by frequency and time resources.

These systems are referred to as multiple input multiple output (MIMO) systems. Typically, MIMO systems require complex controllers to control both the transmission and receiving elements of the mobile station and the base station.

Multi-stream single user MIMO transmission has been proposed and forms part of Wideband Code Division Multiple Access (WCDMA), Third Generation Partnership Project-Long Term Evolution (3GPP LTE), and WiMax system standards. In single user multiple input multiple output (SU-MIMO), a MIMO receiver with multiple antennas and receiving circuitry receives the multiple streams, separates the multiple streams and determines the transmission symbols sent over each stream of the spatially multiplexed data streams.

SUMMARY

Systems and methods for phase alignment among multiple transmitters are described. In an illustrative, non-limiting embodiment, a method may include creating a loop between an RF transmitter and an RF receiver; measuring a first DC signal on the I and Q paths of the RF receiver without inserting a DC signal in the I and Q paths of the RF transmitter; measuring a second DC signal on the I and Q paths of the RF receiver while inserting a non-zero DC signal in the I and Q paths of the RF transmitter; and calculating a relative phase difference between the RF transmitter and the RF receiver using the first and second DC signals.

The method may include prior to measuring the first or second DC signals, calibrating the loop. For example, calibrating the loop may include performing a loop DC cancellation procedure. Additionally or alternatively, calibrating the loop may include performing an I/Q imbalance compensation procedure.

In some cases, calibrating the loop may include: inserting a tone into the transmitter; running a Quadrature Modulator Correction (QMC) filter to provide frequency-independent compensation near DC; and freezing the QMC filter. The tone may have a frequency of approximately 200 kHz. The non-zero DC signal may correspond to a gain index. The method may include repeating the measuring and calculating operations for another gain index. The method may also include storing a relative phase difference for each different gain index. Also, the method may include repeating the creating, measuring, and calculating operations for another RF transmitter within a single communication device.

The first DC signal may be given by $D_{Io}$ and $D_{Qo}$, the second DC signal may be given by $D_{Ip}$ and $D_{Qp}$, the non-zero DC signal may be given by $D_{TXI}$ and $D_{TXQ}$, and the relative phase may be calculated as: $a\tan((D_{Qp}-D_{Qo})/(D_{Ip}-D_{Io})) - a\tan(D_{TXQ}/D_{TXI})$.

In other illustrative, non-limiting embodiments, an electronic circuit may include a processor; and a memory coupled to the controller, the memory having program instructions stored thereon that, upon execution by the processor, cause the processor to: create a loop between an RF transmitter and an RF receiver; measure a first DC signal on the I and Q paths of the RF receiver without inserting a DC signal in the I and Q paths of the RF transmitter; measure a second DC signal on the I and Q paths of the RF receiver while inserting a non-zero DC signal in the I and Q paths of the RF transmitter; and calculate a relative phase difference between the RF transmitter and the RF receiver using the first and second DC signals.

The program instructions, upon execution, may cause the processor to, prior to measuring the first or second DC signals, calibrate the loop at least in part by performing a loop DC cancellation procedure. The program instructions, may also cause the processor to, prior to measuring the first or second DC signals, calibrate the loop at least in part by performing an I/Q imbalance compensation procedure.

Again, the first DC signal may be given by $D_{Io}$ and $D_{Qo}$, the second DC signal may be given by $D_{Ip}$ and $D_{Qp}$, the non-zero DC signal may be given by $D_{TXI}$ and $D_{TXQ}$, and the relative phase may be calculated as: $a\tan((D_{Qp}-D_{Qo})/(D_{Ip}-D_{Io})) - a\tan(D_{TXQ}/D_{TXI})$. The non-zero DC signal may correspond to a gain index, and the program instructions, upon execution, may cause the processor to repeat the measuring and calculating operations for other gain indexes, and to store a relative phase difference for each different gain index. Moreover, the program instructions may further cause the processor to repeat the creating, measuring, and calculating operations for another RF transmitter within a single communication device.

In yet another illustrative, non-limiting embodiment a communication device may include an electronic circuit, comprising: a processor; and a memory coupled to the controller, the memory having program instructions stored thereon that, upon execution, cause the processor to: create a loop between an RF transmitter and an RF receiver; measure a first DC signal on the I and Q paths of the RF receiver without inserting a DC signal in the I and Q paths of the RF transmitter; measure a second DC signal on the I and Q paths of the RF receiver while inserting a non-zero DC signal in the I and Q paths of the RF transmitter; and calculate a relative phase difference between the RF transmitter and the RF receiver using the first and second DC signals; and a plurality of antennas coupled to the plurality of RF transmitters.

The program instructions, upon execution, may cause the processor to, prior to measuring the first or second DC signals, calibrate the loop at least in part by performing a loop DC cancellation procedure and an I/Q imbalance compensation procedure. Yet again, the first DC signal may be given by $D_{Io}$ and $D_{Qo}$, the second DC signal may be given by $D_{Ip}$ and $D_{Qp}$, the non-zero DC signal may be given by $D_{TXI}$ and $D_{TXQ}$, and the relative phase may be calculated as: a $\tan((D_{Qp}-D_{Qo})/(D_{Ip}-D_{Io}))-a \tan(D_{TXQ}/D_{TXI})$.

BRIEF DESCRIPTION OF THE DRAWINGS

Reference will now be made to the accompanying drawings, wherein.

DETAILED DESCRIPTION

The techniques of this disclosure now will be described more fully hereinafter with reference to the accompanying drawings. The techniques of this disclosure may, however, be embodied in many different forms and should not be construed as limited to the embodiments set forth herein. Rather, these embodiments are provided so that this disclosure will be thorough and complete, and will fully convey the scope of the disclosure to a person of ordinary skill in the art. A person of ordinary skill in the art may be able to use the various embodiments described herein.

Figure 1:
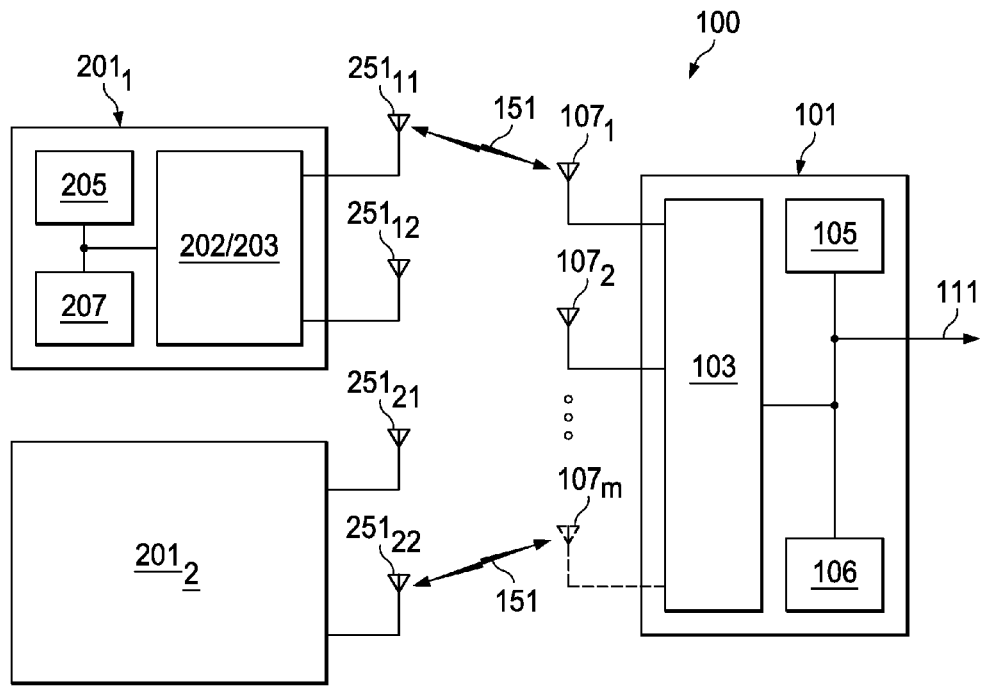
FIG. 1 is a block diagram illustrating an example of an RF communication system, according to some embodiments.

FIG. 1 shows an example of Radio Frequency (RF) communication system 100. It is noted that embodiments described herein may be applicable to a variety of wireless devices, and that wireless communications 151 may use network(s) implemented according to a variety of standards and their evolution, such as, for example, WCDMA (Wideband Code Division Multiple Access), 3GPP LTE (Long Term Evolution), WiMax (Worldwide Interoperability for Microwave Access), UMB (Ultra Mobile Broadband), CDMA (Code Division Multiple Access), 1×EV-DO (Evolution-Data Optimized), WLAN (Wireless Local Area Network), and UWB (Ultra-Wide Band) receivers.

As illustrated, communication system 100 includes base station 101, which may be a node B (NB), an enhanced node B (eNB) or any access server suitable for enabling user equipment (UE) 201 to access wirelessly a communication system. Base station (BS) 101 may transmit to user equipment 201 via wireless environment communications channel 151, which may be known as the downlink (DL), and user equipment (UE) 201 may transmit to base station (BS) 101 via the wireless environment communications channel 151, which may be known as the uplink (UL).

Base station 101 can comprise a processor 105 which may be configured to control the operation of the receiver/transmitter circuitry 103. Processor 105 may be configured to run software stored in memory 106.

Memory 106 may be further configured to store data and/or information to be transmitted and/or received. Memory 106 may further be used to store configuration parameters used by the processor 105 in operating the base station 101.

Transmitter/receiver circuitry 103 may be configured to operate as a configurable transmitter and/or receiver converting between radio frequency signals of a specific protocol for transmission over (or reception via) the wireless environment and baseband digital signals. Transmitter/receiver circuitry 103 may be configured to use memory 106 as a buffer for data and/or information to be transmitted over or received from wireless environment 151.

In addition, transmitter/receiver circuitry 103 may further be configured to be connected to at least one antenna for receiving and transmitting the radio frequency signals over the wireless environment to user equipment $201_1$ and $201_2$ (collectively, "user equipment 201"). In FIG. 1, base station 101 is shown comprising two antennas, first antenna $107_1$ and second antenna $107_2$, both configured to transmit and receive signals. In other embodiments, base station 101 may have more antennas represented by the dotted antenna $107_m$ in FIG. 1.

Base station 101 may be connected to other network elements via communications link 111. Communications link 111 may receive data to be transmitted to user equipment 201 via the downlink and it may transmit data received from the user equipment 201 via the uplink. This data may comprise data for all of the user equipment within the cell or wireless communications range operated by base station 101. Communications link 111 is shown as a wired link. However, it would be understood that the communications link may further be a wireless communications link.

Still referring to FIG. 1, there is shown two user equipment $201_1$ and $201_2$ within the range of the base station 101. However, it would be understood that there may be more or fewer user equipment within range of base station 101. In some implementations, any user equipment may be a mobile station, or may include other apparatus or electronic device suitable for communication with base station 101. For example, the user equipment may be cell phones, tablets, or laptop computers suitable for wireless communication in the environment.

FIG. 1 shows in more detail first user equipment $201_1$. First user equipment $201_1$ may comprise processor 201 configured to control the operation of receiver/transmitter circuitry 202/203. Processor 201 may be configured to run software stored in memory 107. Processor 201 may further control and operate any operation required to be carried out by the user equipment such as operation of the user equipment display, audio and/or video encoding and decoding in order to reduce spectrum usage, etc.

Memory 107 may be further configured to store data and/or information to be transmitted and/or received. Memory 107 may further be used to store configuration parameters used by processor 201 in operating user equipment $201_1$. Memory 107 may be solid state memory, optical memory (such as, for example, CD or DVD format data discs), magnetic memory (such as floppy or hard drives), or any media suitable for storing the programs for operating the processors, configuration data or transmission/reception data.

Transmitter/receiver circuitry 202/203 may be configured to operate as a configurable transmitter and/or receiver converting between radio frequency signals of a specific protocol for transmission over (or reception via) the wireless environment and baseband digital signals. Transmitter/receiver circuitry 202/203 may be configured to use memory 107 as a buffer for data to be transmitted over or received from wireless environment 151.

Transmitter/receiver circuitry 202/203 may also be configured to be connected to at least one antenna for receiving and transmitting the radio frequency signals over the wireless environment to base station 101. In FIG. 1 each user equipment is shown comprising 2 antennas, UE $201_1$ has first antenna $251_{11}$ and second antenna $251_{12}$, and UE $201_2$ has first antenna $251_{21}$ and second antenna $251_{22}$.

Although FIG. 1 and the examples described hereinafter describe the user equipment and the bases station as having a processor arranged to carry out the operations described below, it would be understood that in embodiments of this disclosure the respective processors may comprise a single processor or a plurality of processors. Any combination of one or more of the processors and other components in FIG. 1 may be implemented by one or more integrated circuits.

Some embodiments of this disclosure maybe used in the LTE-Advanced system which may be part of 3GPP LTE. However, it should be appreciated that this is by way of example only and these systems and methods may be used in other systems as well.

In system 100, performance and energy efficiency may be improved by using spatial beamforming, which spreads the transmission energy over multiple transmitters whose combined transmission energy is comparable to the transmission energy of single transmission scenario. In beamforming, the same signal is emitted from each of the transmit antennas with appropriate phase (and optionally gain) weighting such that the signal power is maximized at the receiver input. Benefits of beamforming include increasing the signal gain from constructive combining and to reduce the multipath fading effect. However, successful beamforming relies on the proper coordination of multiple transmitters; especially in terms of signal phases. That is, phase alignment between multiple transmitters is a prerequisite to a successful beamforming.

Conventionally, fairly complex logic has been used for correct alignment for coherent signal insertion and detection or synchronized data captures among systems running in a different clock domain. In contrast, systems and methods described below simplify the method for phase alignment and reduce or eliminate the need for more complex solutions.

In various embodiments, systems and methods disclosed herein may rely on DC insertion instead of a coherent tone. Irrespective of the insertion node, a DC signal—e.g., a signal with a DC component of a known amplitude and phase—may be inserted, and the phase offset estimation may be had without the need for a synchronization between a transmitter and a receiver. Because processor 201 or the transceiver device can insert a DC signal with known amplitude and phase, the phase differences between different transmitters can be compared by calculating the phase of the estimated DC (DC on I channel and Q channel) in the feedback receiver.

Ordinarily, impairments such as DC offset, I/Q imbalance, and 2nd order non-linearity of the transmitter and receiver would degrade the accuracy of the DC-based phase estimation. To address these problems, however, systems and methods described herein may use on-chip calibration logic which equalizes the entire TX-to-RX loop before the DC-based phase estimation. Also, a single receive path is used as a common feedback path, which eliminates any potential errors introduced when different receive paths are used for each transmitter.

Figure 2:
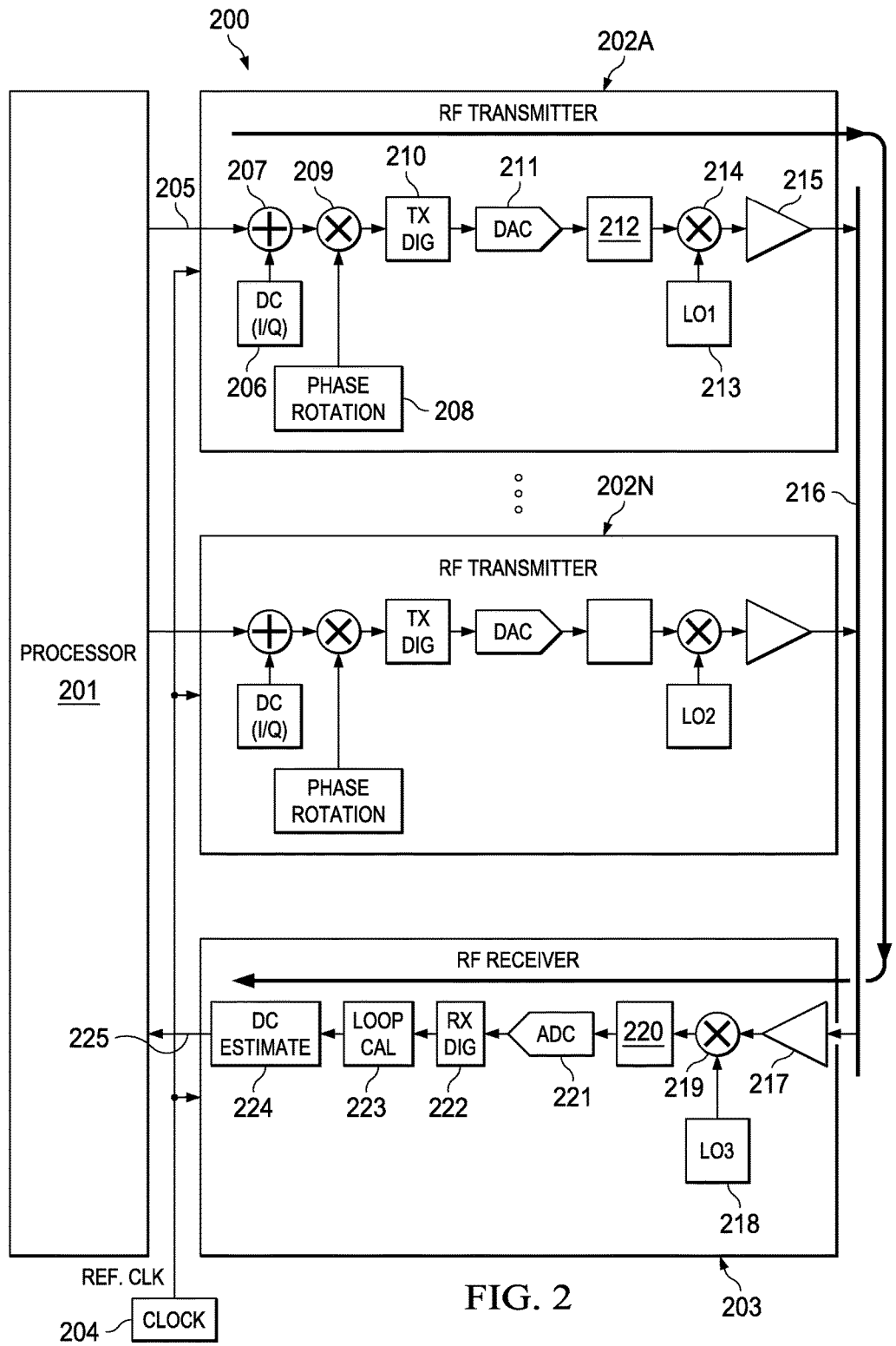
FIG. 2 is a block diagram of an RF circuit according to some embodiments.

FIG. 2 is a block diagram of RF circuit 200 according to some embodiments. Particularly, processor 201 is coupled to clock 204, to RF transmitters 202A-N, and to RF receiver 203. In various implementations, however, any other number of transmitters and receivers may be used.

In normal operation, processor 201 may provide I and Q signals to each of transmitters 202A-N to effect a beamforming technique, for example. These signals are processed by their respective transmitters and are transmitted via antennas $251_{11}$ and $251_{12}$.

For instance, RF transmitter 202A may receive I and Q signals 205 from processor 201, add a selected DC component 206 to signal 205 via adder 207, and mix the output of adder 207 with the output of phase rotation component 208 via mixer 209, which may be (or act as) a digital phase rotator. The output of mixer 209 is provided to TX digital path logics 210, DAC 211, and filter 212, before it is mixed with oscillator signal 213 by mixer 214 and amplified by amplifier 215. Output 216 from transmitter 202A is then provided to antenna $251_{11}$, for example.

To ensure phase alignment among the various transmitters 202A-N, a calibration procedure may be performed. During this phase alignment procedure, which is described in more detail in connection with FIG. 3, processor 201 may configure or create a loop between each of transmitters 202A-N and receiver 203, one at a time, by properly routing the output of transmitters 202A-N to the input of receiver 203 while bypassing the corresponding antenna(s) suing a suitable loop-back circuitry (e.g., a multiplexer). Each time another loop is set up, another transmitter is coupled to the receive path and then calibrated.

In the case of transmitter 202A, for instance, output 216 is provided to the input of amplifier 217 of receiver 203. The output of amplifier 217 is provided to mixer 219, which mixes that signal 206 with another oscillator signal 218. The output of mixer 219 is provided to analog filter/baseband amplifier 220 and ADC 221, RX digital path logic 222, loop calibration block 223, and DC estimation or measurement block 224. In some cases, the DC estimation operation performed by block 224 may employ a digital low-pass filter (LPF) or the like.

Output 225 of DC estimation or measurement block 224 is provided to processor 201, which can then use the results of the calibration procedure to modify I and Q signals sent to transmitters 202A-N in a manner that ensures phase alignment between them during a beamforming operation.

Figure 3:
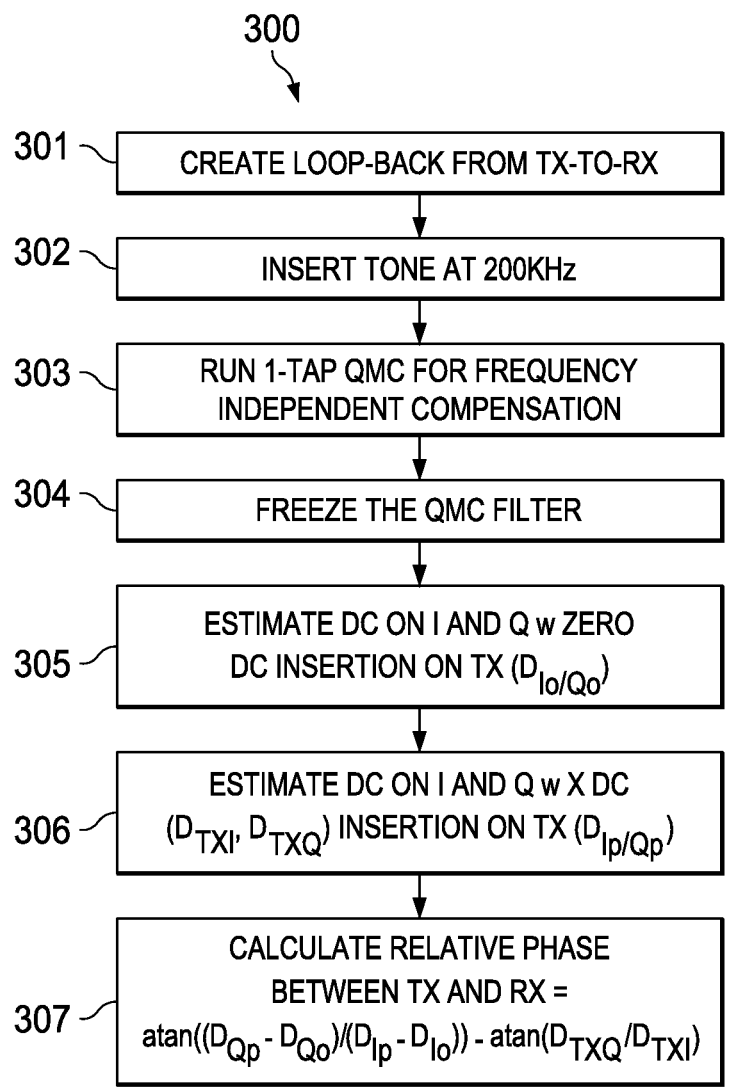
FIG. 3 is a flowchart illustrating an example of a method for phase alignment among multiple transmitters according to some embodiments.

FIG. 3 is a flowchart of an example of method 300 for phase alignment among multiple transmitters. In some embodiments, method 300 includes creating or configuring a loop between an RF transmitter (202A) and an RF receiver (203) at block 301, and beginning a pre-calibration procedure. In some case, the pre-calibration includes a loop DC cancellation procedure and/or an I/Q imbalance compensation procedure performed by loop calibration block 223.

Still referring to pre-calibration, the following conditions may be assumed in an ideal case. First, no DC offset components are added by the TX and RX data paths. Second, there is a 90 degree phase difference between I and Q. Therefore, a DC signal may be used to estimate by how much the phase is rotated as the DC signal propagates through a given loop. And, if the TX channel is static, it is assumed that the phase difference is caused by the RX channel. Because actual paths are not ideal, however, the following procedure may be conducted to make a non-ideal path close to an ideal one.

First, with regard to loop DC cancellation, in terms of phase estimation, no interest is placed how much of the DC offsets come from the TX path or the RX path. Hence, in some cases, this operation can be performed digitally by cancelling total DC offset from the loop at RX output. As to, loop I/Q imbalance compensation, the composite I/Q imbalance of TX-to-RX RX loop may be measured and compensated together. This operation may be performed, for example, using a single tap I/Q mismatch compensation logic which estimates the frequency independent components of I/Q mismatches (60 dB of IRR guarantees 0.1 degree error between I and Q).

In this example, as part of the pre-calibration procedure, block 302 inserts a tone into the transmitter, block 303 runs a Quadrature Modulator Correction (QMC) filter (e.g., 1-tap) to provide frequency-independent compensation, and block 304 freezes the QMC filter. In some implementations, the tone may have a frequency of approximately 200 kHz.

Then, blocks 305 through 307 are performed by DC estimation or measurement block 224 for each TX-to-RX loop, and for each gain setting or index of interest: block 305 measures the magnitudes ($D_{Io}$, $D_{Qo}$) of a first DC signal on the I and Q paths of the RF receiver, respectively, without inserting a DC signal in the I and Q paths of the RF transmitter; block 306 measures the magnitudes ($D_{Ip}$, $D_{Qp}$) of a second DC signal on the I and Q paths of the RF receiver, respectively, while inserting a non-zero DC signal ($D_{TXI}$, $D_{TXQ}$ in the I and Q paths of the RF transmitter; and block 307 calculates calculating a relative phase difference between the RF transmitter and the RF receiver using these measurements. By changing the gain index, the receiver RF gain is also changed (increased or decreased).

For example, in some embodiments, the relative phase difference for the selected transmitter may be given by: a $\tan((D_{Qp}-D_{Qo})/(D_{Ip}-D_{Io}))$–a $\tan(D_{TXQ}/D_{TXI})$, where the a tan functions are calculated in 4-quadrants. Upon repetition, method 300 may store the relative phase difference for a plurality of different gains (given by different gain indexes) for each transmitter, and it may do so for every transmitter 202A-N in the array. For each transmitter, the process of FIG. 3 is repeated after a new loop is created under control of processor 201. The phase difference may then be used by processor 201 in order to provide I and Q signals to transmitters 202A-N that are phased aligned when they get to their respective antennas.

In sum, when the RF gain is changed, the impedance of RF signal path is changed. This may result in the phase shift of the signal. To maintain or improve signal quality, it is desirable to limit the amount of phase change to below 5 degrees (or some other selected threshold value) for any gain change. A way to offset the phase change induced by the gain change is via calibration. To perform this operation, method 300 may calibrate (on-chip) the amount of phase shift for each gain step.

Figure 4:
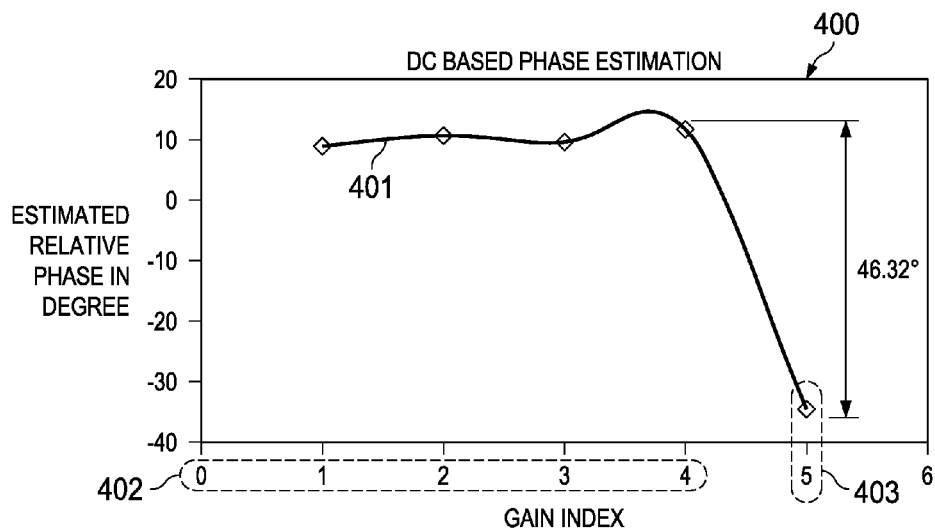
FIG. 4 is a graph illustrating an example of phase estimation against gain according to some embodiments.

FIG. 4 is a graph illustrating an example of phase estimation against gain according to some embodiments. As shown, curve 402 shows the relative phase in degrees as a function of gain index for a particular transmitter. Generally speaking, phase differences may be acceptable up to a certain threshold (e.g., 5 degrees). As shown, gain indexes 402 fall within this range, but index 403 does not, and has been estimated or measured to be off by approximately 46°. Therefore, when transmitting signals in a normal configuration using gain index 403, processor 201 may offset the I and/or Q signals sent to that particular transmitter by 46°.

It should be understood that the various operations described herein, particularly in connection with FIG. 3, may be implemented by processing circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

A person of ordinary skill in the art will appreciate that the various circuits depicted above are merely illustrative and is not intended to limit the scope of the disclosure described herein. In particular, a device or system configured to perform audio power limiting based on thermal modeling may include any combination of electronic components that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other circuit configurations.

It will be understood that various operations discussed herein may be executed simultaneously and/or sequentially. It will be further understood that each operation may be performed in any order and may be performed once or repetitiously.

Many modifications and other embodiments come to mind to one skilled in the art to which this disclosure pertains having the benefit of the teachings presented in the foregoing descriptions, and the associated drawings. Therefore, it is to be understood that this disclosure is not to be limited to the specific embodiments disclosed. Although specific terms are employed herein, they are used in a generic and descriptive sense only and not for purposes of limitation.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   creating a loop between an RF transmitter and an RF receiver;
   measuring a first DC signal on the I and Q paths of the RF receiver without inserting a DC signal in the I and Q paths of the RF transmitter;
   measuring a second DC signal on the I and Q paths of the RF receiver while inserting a non-zero DC signal in the I and Q paths of the RF transmitter;
   calculating a relative phase difference between the RF transmitter and the RF receiver using the first and second DC signals; and
   prior to measuring the first or second DC signals, calibrating the loop;
   wherein calibrating the loop further comprises:
   inserting a tone into the transmitter;
   running a Quadrature Modulator Correction (QMC) filter to provide frequency-independent compensation near DC; and
   freezing the QMC filter.

2. The method of claim 1, wherein the tone has a frequency of approximately 200 kHz.

3. A method, comprising:
creating a loop between an RF transmitter and an RF receiver;
measuring a first DC signal on the I and Q paths of the RF receiver without inserting a DC signal in the I and Q paths of the RF transmitter;
measuring a second DC signal on the I and Q paths of the RF receiver while inserting a non-zero DC signal in the I and Q paths of the RF transmitter;
calculating a relative phase difference between the RF transmitter and the RF receiver using the first and second DC signals; and
repeating the creating, measuring, and calculating operations for another RF transmitter within a single communication device.

4. A method, comprising:
creating a loop between an RF transmitter and an RF receiver;
measuring a first DC signal on the I and Q paths of the RF receiver without inserting a DC signal in the I and Q paths of the RF transmitter;
measuring a second DC signal on the I and Q paths of the RF receiver while inserting a non-zero DC signal in the I and Q paths of the RF transmitter;
calculating a relative phase difference between the RF transmitter and the RF receiver using the first and second DC signals;
wherein the first DC signal is given by $D_{Io}$ in the I path and $D_{Qo}$ in the Q path, wherein the second DC signal is given by $D_{Ip}$ in the I path and $D_{Qp}$ in the Q path, wherein the non-zero DC signal is given by $D_{TXI}$ in the I path and $D_{TXQ}$ in the Q path, and wherein the relative phase difference is calculated as: $a\tan((D_{Qp}-D_{Qo})/(D_{Ip}-D_{Io})) - a\tan(D_{TXQ}/D_{TXI})$.

5. An electronic circuit, comprising:
a processor; and
a memory coupled to the controller, the memory having program instructions stored thereon that, upon execution by the processor, cause the processor to:
create a loop between an RF transmitter and an RF receiver;
measure a first DC signal on the I and Q paths of the RF receiver without inserting a DC signal in the I and Q paths of the RF transmitter;
measure a second DC signal on the I and Q paths of the RF receiver while inserting a non-zero DC signal in the I and Q paths of the RF transmitter; and
calculate a relative phase difference between the RF transmitter and the RF receiver using the first and second DC signals;
wherein the first DC signal is given by $D_{Io}$ in the I path and $D_{Qo}$ in the Q path, wherein the second DC signal is given by $D_{Ip}$ in the I path and $D_{Qp}$ in the Q path, wherein the non-zero DC signal is given by $D_{TXI}$ in the I path and $D_{TXQ}$ in the Q path, and wherein the relative phase difference is calculated as: $a\tan((D_{Qp}-D_{Qo})/(D_{Ip}-D_{Io})) - a\tan(D_{TXQ}/D_{TXI})$.

6. An electronic circuit, comprising:
a processor; and
a memory coupled to the controller, the memory having program instructions stored thereon that, upon execution by the processor, cause the processor to:
create a loop between an RF transmitter and an RF receiver;
measure a first DC signal on the I and Q paths of the RF receiver without inserting a DC signal in the I and Q paths of the RF transmitter;
measure a second DC signal on the I and Q paths of the RF receiver while inserting a non-zero DC signal in the I and Q paths of the RF transmitter; and
calculate a relative phase difference between the RF transmitter and the RF receiver using the first and second DC signals;
wherein the program instructions, upon execution, further cause the processor to repeat the creating, measuring, and calculating operations for another RF transmitter within a single communication device.

7. A communication device, comprising:
an electronic circuit, comprising:
a processor; and
a memory coupled to the controller, the memory having program instructions stored thereon that, upon execution, cause the processor to:
create a loop between an RF transmitter and an RF receiver;
measure a first DC signal on the I and Q paths of the RF receiver without inserting a DC signal in the I and Q paths of the RF transmitter;
measure a second DC signal on the I and Q paths of the RF receiver while inserting a non-zero DC signal in the I and Q paths of the RF transmitter; and
calculate a relative phase difference between the RF transmitter and the RF receiver using the first and second DC signals; and
a plurality of antennas coupled to the plurality of RF transmitters.

8. The communication device of claim 7, wherein the program instructions, upon execution, further cause the processor to, prior to measuring the first or second DC signals, calibrate the loop at least in part by performing a loop DC cancellation procedure and an I/Q imbalance compensation procedure.

9. The communication device of claim 8, wherein the first DC signal is given by $D_{Io}$ in the I path and $D_{Qo}$ in the Q path, wherein the second DC signal is given by $D_{Ip}$ in the I path and $D_{Qp}$ in the Q path, wherein the non-zero DC signal is given by $D_{TXI}$ in the I path and $D_{TXQ}$ in the Q path, and wherein the relative phase difference is calculated as: $a\tan((D_{Qp}-D_{Qo})/(D_{Ip}-D_{Io})) - a\tan(D_{TXQ}/D_{TXI})$.

* * * * *